United States Patent
Ma

(10) Patent No.: US 10,653,166 B2
(45) Date of Patent: May 19, 2020

(54) NON-GRAIN ECOLOGICAL FEED AS WELL AS PREPARATION METHOD AND FEEDING METHOD THEREOF

(71) Applicant: Shenzhen Seven Color Land Agricultural Technology Co., Ltd., Shenzhen (CN)

(72) Inventor: Jianhang Ma, Shenzhen (CN)

( * ) Notice: Subject to any disclaimer, the term of this patent is extended or adjusted under 35 U.S.C. 154(b) by 0 days.

(21) Appl. No.: 16/048,555

(22) Filed: Jul. 30, 2018

(65) Prior Publication Data

US 2018/0332871 A1 Nov. 22, 2018

Related U.S. Application Data

(63) Continuation of application No. PCT/CN2016/073049, filed on Feb. 1, 2016.

(30) Foreign Application Priority Data

Jan. 28, 2016 (CN) .......................... 2016 1 0057644

(51) Int. Cl.
| | |
|---|---|
| *A23K 10/18* | (2016.01) |
| *A23K 10/14* | (2016.01) |
| *A23K 40/20* | (2016.01) |
| *A23K 20/189* | (2016.01) |
| *A23K 10/37* | (2016.01) |
| *A23K 50/10* | (2016.01) |
| *A23K 50/00* | (2016.01) |

(52) U.S. Cl.
CPC .............. *A23K 10/18* (2016.05); *A23K 10/14* (2016.05); *A23K 10/37* (2016.05); *A23K 20/189* (2016.05); *A23K 40/20* (2016.05); *A23K 50/00* (2016.05); *A23K 50/10* (2016.05); *Y02P 60/877* (2015.11)

(58) Field of Classification Search
CPC ........ A23K 10/14; A23K 10/18; A23K 10/37; A23K 20/189; A23K 40/20; A23K 50/00; A23K 50/10
See application file for complete search history.

(56) References Cited

U.S. PATENT DOCUMENTS

| | | | | |
|---|---|---|---|---|
| 3,686,392 | A * | 8/1972 | Hamada ............... | A23K 20/153 424/442 |
| 2002/0004096 | A1* | 1/2002 | Shinzato ............... | A23K 20/142 426/623 |
| 2006/0240077 | A1* | 10/2006 | Hansen ................. | A61K 31/715 424/442 |
| 2010/0124583 | A1* | 5/2010 | Medoff .................... | A61K 8/97 426/2 |
| 2015/0342224 | A1* | 12/2015 | Medoff ................... | A61Q 19/00 426/63 |
| 2016/0366913 | A1* | 12/2016 | Gordon .................. | A23K 40/20 |

FOREIGN PATENT DOCUMENTS

| | | | |
|---|---|---|---|
| CN | 102018146 A | 4/2011 | |
| CN | 102726594 A | 10/2012 | |
| CN | 102834521 A * | 12/2012 | ............ C07K 14/37 |
| CN | 102894215 A | 1/2013 | |
| CN | 103315197 A * | 9/2013 | |
| CN | 103932286 A * | 7/2014 | |
| CN | 104543464 A | 4/2015 | |
| CN | 104839426 A | 8/2015 | |

OTHER PUBLICATIONS

Internation Search Report of PCT/CN2016/073049, dated Apr. 13, 2016.

* cited by examiner

*Primary Examiner* — Tamra L. Dicus
(74) *Attorney, Agent, or Firm* — Erson IP (Nelson IP)

(57) ABSTRACT

A complicated enzyme system and microorganisms are used for acting on straws and food industrial residues to convert the straws and the food industrial residues into glucose and part of oligosaccharide, amino acids, small peptides, inositol and nucleic acids and to supply mineral substances, trace elements and nutritional substances such as vitamins in the straws and the food industrial residues to monogastric animals for use. Through adding of Chinese herbal medicines, the digestion function of a monogastric animal may be enhanced, and the immune function of the monogastric animal may be enhanced, thereby reducing occurrence of diseases. In addition, the complicated enzyme system supplements exogenous enzymes in a digestive tract of the monogastric animal to reduce protein and phytic acid residues in excrements, reduce odor and improve the environment of a hog house, thereby obviously reducing drug and treatment costs.

9 Claims, No Drawings

NON-GRAIN ECOLOGICAL FEED AS WELL AS PREPARATION METHOD AND FEEDING METHOD THEREOF

CROSS-REFERENCE TO RELATED APPLICATIONS

This application is a continuation of International Patent Application No. PCT/CN2016/073049 with filing date of Feb. 1, 2016, designating the United States, now pending, and further claims priority to Chinese Patent Application No. 201610057644.3 with a filing date of Jan. 28, 2016. The content of the aforementioned applications, including any intervening amendments thereto, are incorporated herein by reference.

TECHNICAL FIELD

The present invention relates to the technical field of livestock breeding, in particular to a non-grain ecological feed as well as a preparation method and a feeding method thereof.

BACKGROUND OF THE PRESENT INVENTION

At present, there is an embarrassment that people and animals compete for food is China. In 2013, more than 60 million tons of soybeans were imported into China. If no soybean is imported, feeds would be insufficient, resulting in that there will be no meat to eat and no milk to drink tomorrow. Some people think that we have so many straws and we can feed cows! But, the cows produce no milk after eating the straws since the straw's have an extremely low nutritional value, not alone feeding a monogastric animal with the straw feeds. If the monogastric animal is completely fed with concentrated feeds, problems that meat is not sweet, antibiotic residues exceed the standard, the farrowing rate of a parent body is reduced, and the survival rate of young animals is reduced are caused. Without new ideas, new methods and new technologies, there will be an increasing shortage of grains, and the problem on safety of livestock products will become more serious. During agricultural production now, a large quantity of crop straws is burnt, leading to environmental pollution. In a food processing process, a large number of food residues are abandoned, which is a huge waste of biological resources. Preparing the food residues into high-quality feeds which may be absorbed and used by animals achieves extremely high economical, social and ecological benefits. According to a Chinese patent "Dual-imitation Straw Feed" with a patent No. 89109439, a rumen function and an appendix function are imitated, and straws and weeds are converted into a feed for the monogastric animals, and may replace grain feeds at a relatively high proportion. However, there is still a distance for the taste and components of this feed to meet feeding habits of the monogastric animals. The original technologies are all low in conversion efficiency during conversion and low in feed palatability, and nutritional components of the feed are not reasonable enough, so that real conversion from a non-grain feed to a grain feed is not realized comprehensively from multiple aspects, such as energy, proteins, vitamins, trace elements and the like, of the feed.

SUMMARY OF PRESENT INVENTION

The objective of the present invention is to provide a non-grain ecological feed as well as a preparation method and a feeding method thereof, so as to solve the ems that a feed is low in conversion efficiency and low in palatability, contains reasonable nutritional components, and may not be used by a monogastric animal as it may not meet a feeding habit of the monogastric animal in the prior art.

A technical solution to be adopted for solving the technical problems by the present invention is as follows: a non-grain ecological feed is prepared from the following effective components in parts by weight: 40 to 80 parts of corn straws, 1 to 25 parts of jerusalem artichoke straws, 0.5 to 20 parts of residues from juicing jerusalem artichoke, 0.5 to 20 parts of residues from juicing carrot, 0.5 to 20 parts of *Folium mori*, 0.1 to 15 parts of *Astragalus membranaceus*, 0.02 to 5 parts of papain, 0.02 to 5 parts or phytase 0.5 to 20 parts of cellobiase, 0.1 to 15 parts of glucanase 0.02 to 5 parts of xylanase, 0.001 to 0.3 part of pectinase, 0.001 to 0.3 part of fungal amylase, 0.01 to 3 parts of beer yeast, 0.002 to 0.5 part of *Aspergillus niger*, 0.005 to 1 part of *Tichoderma reesei* and 0.001 to 0.3 part of *Geotrichum candidum*.

The non-grain ecological heed of the present invention is prepared from the following effective components in parts by weight: 45 to 70 parts of the corn straws, 5 to 20 parts of the jerusalem artichoke straws, 2 to 15 parts of the residues from juicing jerusalem artichoke, 2 to 15 parts of the residues from juicing carrot, 2 to 15 parts of the *Folium mori*, 0.5 to 8 parts of the *Astragalus membranaceus*, 0.1 to 1.5 parts of the papain, 0.1 to 1.5 parts of the phytase, 2 to 15 parts of the cellobiase, 0.5 to 8 parts of the glucanase, 0.1 to 2 parts of the xylanase, 0.005 to 0.1 part of the pectinase, 0.005 to 0.1 part of the fungal amylase, 0.05 to 1 part of the beer yeast, 0.01 to 0.1 part of the *Aspergillus niger*, 0.02 to 0.5 part of the *Tichoderma reesei* and 0.005 to 0.1 part of the *Geotrichum candidum*.

The non-grain ecological feed of the present invention is prepared from the following effective components in parts by weight: 50 to 60 parts of the corn straws, 10 to 15 parts of the jerusalem artichoke straws, 5 to 10 parts of the residues from juicing jerusalem artichoke, 5 to 10 parts of the residues from juicing carrot, 5 to 10 parts of the *Folium mori*, 1 to 3 parts of the *Astragalus membranaceus*, 0.2 to 0.5 part of the papain, 0.2 to 0.5 part of the phytase, 5 to 10 parts of the cellobiase, 1 to 3 parts of the glucanase, 0.2 to 0.5 part of the xylanase, 0.01 to 0.03 part of the pectinase, 0.01 to 0.03 part of the fungal amylase, 0.1 to 0.3 part of the beer yeast, 0.02 to 0.05 part of the *Aspergillus niger*, 0.05 to 0.1 part of the *Tichoderma reesei* and 0.01 to 0.03 part of the *Geotrichum candidum*.

The non-grain ecological feed of the present invention is prepared from the following effective components in parts by weight: 54 to 58 parts of the corn straws, 12 to 14 parts of the jerusalem artichoke straws, 7 to 9 parts of the residues from juicing jerusalem artichoke, 6 to 8 parts of the residues from juicing carrot, 7 to 9 parts of the *Folium mori*, 1.5 to 2 parts of the *Astragalus membranaceus*, 0.3 to 0.4 part of the papain, 0.3 to 0.4 part of the phytase, 7.5 to 8 parts of the cellobiase, 1.5 to 2.5 parts of the glucanase, 0.3 to 0.4 part of the xylanase, 0.02 to 0.025 part of the pectinase, 0.015 to 0.02 part of the fungal amylase, 0.15 to 0.2 part of the beer yeast, 0.03 to 0.04 part of the *Aspergillus niger*, 0.07 to 0.08 part of the *Tichoderma reesei* and 0.02 to 0.025 part of the *Geotrichum candidum*.

The present invention farther provides a preparation method of the alone-mentioned non-grain ecological feed, including the following steps:

A. mixing the effective components of the non-grain ecological feed according to mass ratios to obtain an initial material;

B. adding water into the initial material, and uniformly stirring and mixing the initial material and the water;

C. briquetting the mixture by using a hydraulic briquetting machine; and

D. performing enzymolysis under an anaerobic condition.

According to the preparation method of the non-grain ecological feed of the present invention, in Step B, after the water is added into the initial material, the water content is 50% to 85%.

According to the preparation method of the non-grain ecological feed of the present invention, in Step B, the water added into the initial material is wastewater from food processing plants.

The preparation method of the non-grain ecological feed of the present invention further includes Step E between Step C and Step D: after briquetting, bagging a briquette with a plastic bag provided with a unidirectional ventilating valve, and sealing the opening of the bag.

According to the preparation method of the non-grain ecological feed of the present invention, in Step D, an enzymolysis temperature is 25.degree. C. to 32.degree. C., and the enzymolysis lasts for 15 to 40 days.

The present invention further provides a feeding method of the above-mentioned non-grain ecological feed. The non-grain ecological feed is used for feeding a monogastric animal or a ruminant. The non-grain ecological feed may directly feed the monogastric animal or feed the monogastric animal with other grain feeds. The non-grain ecological feed feeds the ruminant with course feeds.

Through implementation of the non-grain ecological feed as well as the preparation method and the feeding method in the present invention, the following beneficial effects are achieved: a complicated enzyme system and microorganisms are used in the non-grain ecological feed of the present invention for acting on straws and food industrial residues to convert the straws and the food industrial residues into glucose and part of oligosaccharide, amino acids, small peptides, inositol and nucleic acids and to supply mineral substances, trace elements and nutritional substances such as vitamins in the straws and the food industrial residues to the monogastric animal for use. Furthermore, through the adding of Chinese herbal medicines, the digestion function of the monogastric animal may be enhanced, and the immune function of the monogastric animal may be enhanced, thereby reducing occurrence of diseases. In addition, the complicated enzyme system supplements exogenous enzymes in a digestive tract of the monogastric animal to reduce protein and phytic acid residues in excrements, reduce odor and improve the environment of a hog house, thereby obviously reducing drug and treatment costs. Through the adding of the *Folium mori,* 17 natural amino acids, various vitamins, mineral substances and the like in the feed may be supplemented, and functions of resisting stress, resisting aging, enhancing body endurance, adjusting epinephrine and the like are realized, thereby enhancing the disease resistance of the monogastric animal. Through the adding of the *Astragalus membranaceus*, the digestion function of the monogastric animal is enhanced, and the organ substance metabolism of the monogastric animal is accelerated. In such, a breeding process, animals grow robust, with enhanced digestion function. The farrowing rate of a parent body may be increased, and the survival rate of young animals is increased, thereby reducing the breeding cost.

DETAILED DESCRIPTION OF PREFERRED EMBODIMENTS

A non-grain ecological feed as well as a preparation method and a feeding method of the present invention are further described below in combination with embodiments.

The present invention includes; preparing and mixing effective components such as corn straws, jerusalem artichoke straws, jerusalem artichoke processing residues, residues from juicing carrot, *Folium mori, Astragalus membranaceus*, papain, phytase, cellobiase, glucanase, xylanase, pectinase, fungal amylase, beer yeast, *Aspergillus niger, Tichoderma reesei* and *Geotrichum candidum* according to mass ratios to obtain an initial material; conveying the initial material into a material mixing tank for mixing through a winch conveyor; adding water into the material mixing tank to enable the water content of the initial material to be between 50% and 85%, wherein preferably, the water content of the initial material is between 60% and 70%; after the initial material is uniformly stirred and mixed, conveying the initial material to a hydraulic briquetting machine for briquetting; after briquetting, bagging a briquette with a plastic bag provided with a unidirectional ventilating valve, and sealing the opening of the bag; performing random sampling detection to check whether an external package is damaged or not, and whether the opening is sealed tightly; and then transferring the bag into a temperature-controllable storehouse for enzymolysis under the condition of 25.degree. C. to 32.degree. C. for 15 to 40 days, thereby obtaining the non-grain ecological feed, preferably for enzymolysis under the condition of 28.degree. C. to 32.degree. C. for 25 to 35 days, and more preferably for enzymolysis under the condition of 28.degree. C. to 32.degree. C. for 30 days, thereby obtaining the non-grain ecological feed.

It should be noted that the jerusalem artichoke processing residues and the carrot processing residues are respectively residues obtained by juicing the jerusalem artichoke and carrots. A process includes: cleaning, pulping, plate-frame pressure filtration and obtaining of the residues.

The water is added into the initial material in the material mixing tank to control the range of the water content of the initial material, thereby facilitating interaction in the initial material, particularly facilitating interaction between bacteria and enzymes, and the non-grain ecological feed with a relatively good effect is obtained.

The water added into the material mixing tank may be ordinary clean water or wastewater from food processing plants, preferably the wastewater from the food processing plants, thereby relieving water pollution, reducing the cost and fulfilling an aim of environmental protection. The water may be directly, added into the tank, but more preferably, the water is added into the material mixing tank in a spraying manner, thereby fulfilling an aim of uniformly dispersing the water to the initial material, so that the initial material is easier to mix uniformly, the mixing time is shortened, and the efficiency is improved.

It should be further noted that hydraulic briquetting facilitate the enzymolysis of the initial material and is favorable for forming a subsequent anaerobic environment. After the briquetting is completed, the purpose of bagging the briquette with the plastic bag provided with unidirectional ventilating valve and sealing the opening of the bag is to realize an anaerobic condition during enzymolysis. Carbon dioxide produced during enzymolysis may be discharged from the unidirectional ventilating valve, and other types of gas are unable to enter the plastic bag filled with the briquette. Of course, the anaerobic condition is not limited to this, and a special anaerobic reactor or anaerobic bacteria also may be used.

The non-grain ecological feed of the present invention may directly feed the monogastric animal or feed the monogastric animal with other grain feeds. It requires that the non-grain ecological feed of the present invention feeds a ruminant with course feeds. The non-grain ecological feed prepared through the present invention may completely replace a grain feed during breeding of the monogastric animal, and obviously increases the farrowing rate of a parent body and the survival rate of young animals and reduces the morbidity of animals. When the non-grain ecological feed of the present invention is added into the feed for the ruminant, the digestion utilization rate of the animal is obviously increased by 20% to 25%. When the non-grain ecological feed of the present invention is used for feeding pigs, the farrowing rate of sows is increased by 3% to 8%, the survival rate of piglets is increased by 4% to 8%, the total content of amino acids in pork of fattening pigs is up to 22% to 25%, and the content of glutamic acid is up to 4.2%. When the non-grain ecological feed of the present invention is used for feeding laying hens, 100 grams of eggs contain 251 milligrams of cholesterol, which is half of the cholesterol content of common eggs. Therefore, feeding the animals with the non-grain ecological feed of the present invention saves grains and solves the problem on food safety.

According to the non-grain ecological feed of the present invention, the straws, the residues obtained by food processing and part of the Chinese herbal medicines are converted into glucose and part of oligosaccharide, amino acids, small peptides, inositol and nucleic acids through various enzyme preparations and microbial agents, and mineral substances, trace elements and nutritional substances such as vitamins in the straws, the residues and the Chinese herbal medicines are supplied to the monogastric animal for use. In addition, the non-grain ecological feed not only replaces grains, but also has rich apple flavor and fresh taste as well as high palatability, thereby enhancing the immunity of the animals, reducing the morbidity, greatly reducing the breeding cost, reducing protein and phytic acid residues in excrements, reducing odor and improving a breeding environment.

The various effective components have the following outstanding characteristics through analysis in principle that:

(1) the corn straws and the jerusalem artichoke straws are degraded into glucose and part of oligosaccharide and dietary fiber under the combined action of the enzyme preparations and the microbial agents, and release a large number of mineral substances and vitamins, so as to provide sufficient energy and nutrition for growth of the animals.

(2) The residues obtained by processing of jerusalem artichoke and carrots are degraded into part of glucose and oligosaccharide as well as nucleic acids under the combined action of the enzyme preparations and the microbial agents, and release a large number of mineral substances and a large number of nutritional substances such as vitamins.

(3) A proper amount of protease and phytase may convert proteins and phytic acids in the straws, the residues obtained by food processing, the *Folium mori* and the *Astragalus membranaceus* into amino acids, small peptides, inositols and the like which may be used by the monogastric animal, so as to provide nutrition for growth of the beer yeast and other thalli.

(4) A proper amount of cellulose disaccharidase the glucanase, the xylanase and the pectinase may convert straw fiber into glucose and part of oligosaccharide which are used as energy sources of a feed for the monogastric animal.

(5) A proper amount of the *Geotrichum candidum* not only can promote conversion of the wastewater obtained by food processing, but also can enhance the flavor of the non-grain feed to enable the non-grain feed to have rich apple flavor. This feed is higher in palatability. Nucleic acids released by the *Geotrichum candidum* may enhance the immunity of the animal.

(6) A proper amount of the amylase may convert starch in the straws, the residues obtained by food processing, the *Folium mori* and the *Astragalus membranaceus* into sugar, so as to provide a carbon source for growth of the thalli.

(7) A proper amount of the beer yeast may be used as thalli protein through reproduction, and used by the monogastric animal. Furthermore, the beer yeast may inhibit growth of external and harmful bacteria in a digestive tract and is favorable for absorption of mineral substances. In addition to the protein, the beer yeast further contains rich vitamin B, calcium, iron, potassium, magnesium, sodium and the like.

(8) A proper amount of the *Aspergillus niger* and the *Tichoderma reesei* produce a large number of enzymes through the growth of the thalli to enrich enzyme systems and promote degradation and utilization of the materials such as the straws.

(9) A proper amount of the *Folium mori* not only can provide high-quality proteins for the non-grain feed, but also can enhance the disease resistance of the animal.

(10) A propel amount of the *Astragalus membranaceus* has the effects of accelerating the organ substance metabolism and promoting the growth of the The present invention's described below through different embodiments.

Embodiment 1

The preparation method includes: mixing 500 Kg of corn straws, 150 Kg of jerusalem artichoke straws, 75 Kg of residues from juicing jerusalem artichoke, 75 Kg of residues from juicing carrot, 80 Kg of *Folium mori*, 15 Kg of *Astragalus membranaceus*, 2 Kg of papain, 2 Kg of phytase, 80 Kg of cellobiase, 15 Kg of glucanase, 3 Kg of xylanase, 0.2 Kg of pectinase, 0.2 Kg of fungal amylase, 1 Kg of beer yeast, 0.3 Kg of *Aspergillus niger*, 1 Kg of *Tichoderma reesei* and 0.3 Kg of *Geotrichum candidum* according to weights to obtain an initial material; conveying the initial material into a material mixing tank for mixing through a winch conveyor; spraying part wastewater from a food processing plant into the material mixing tank to enable the water content of the initial material to be 60%; after the initial material is uniformly stirred and mixed, conveying the initial material to a hydraulic briquetting machine for briquetting; after briquetting, bagging a briquette with a plastic bag provided with a unidirectional ventilating valve, and sealing the opening of the bag; performing random sampling detection; and then transferring the bag into a temperature-controllable storehouse for enzymolysis under the condition of 30.degree. C. for 30 days, thereby obtaining the non-grain ecological feed.

Embodiment 2

The preparation method includes: mixing 800 Kg of corn straws, 10 Kg of jerusalem artichoke straws, 5 Kg of residues from juicing jerusalem artichoke, 200 Kg of residues from juicing carrot, 5 Kg of *Folium mori,* 150 Kg of *Astragalus membranaceus,* 0.2 Kg of papain, 50 Kg of phytase, 5 Kg of cellobiase, Kg of glucanase, 50 Kg of xylanase, 0.01 Kg of pectinase, 3 Kg of fungal amylase, 0.1 of beer yeast, 5 Kg of *Aspergillus niger,* 0.05 Kg of *Tichoderma reesei* and 0.01 Kg of *Geotrichum candidum* according to weights to obtain an initial material; conveying the initial material into a material mixing tank for mixing through a winch conveyor; directly pouring ordinary clean water into the material mixing tank to enable the water content of the initial material to be 85%; after the initial material is uniformly stirred and mixed, conveying the initial material to a hydraulic briquetting machine for briquetting; after briquetting, performing random sampling detection; and then performing enzymolysis in an anaerobic reactor under the condition of 25.degree. C. for 40 days, thereby obtaining the non-grain ecological feed.

Embodiment 3

The preparation method includes: mixing 400 Kg of corn straws, 250 Kg of jerusalem artichoke straws, 200 Kg of residues from juicing jerusalem artichoke, 5 Kg of residues from juicing carrot, 200 Kg of *Folium mori,* 1 Kg of *Astragalus membranaceus,* 50 Kg of papain, 0.2 Kg of phytase, 200 Kg of cellobiase, 150 Kg of glucanase, 0.2 Kg of xylanase, 3 Kg of pectinase, 0.01 Kg of fungal amylase, 30 Kg of beer yeast, 0.02 Kg of *Aspergillus niger,* 10 Kg of *Tichoderma reesei* and 3 Kg of *Geotrichum candidum* according to weights to obtain an initial material; conveying the initial material into a material mixing tank for mixing through a winch conveyor; spraying part of wastewater from a food processing plant into the material mixing tank to enable the water content of the initial material to be 50%; after the initial material uniformly stirred and mixed, conveying the initial material to a hydraulic briquetting machine for briquetting; after briquetting, bagging a briquette with a plastic bag provided with a unidirectional ventilating valve, and sealing the opening of the bag; performing random sampling detection; and then transferring the bag into a temperature-controllable storehouse for enzymolysis under the condition of 32.degree. C. for 15 days, thereby obtaining the non-grain ecological feed.

Embodiment 4

The preparation method includes: mixing 700 Kg of corn straws, 50 Kg of jerusalem artichoke straws, 20 Kg of residues from juicing jerusalem artichoke, 150 Kg of residues from juicing carrot, 20 Kg of *Folium mori,* 5 Kg of *Astragalus membranaceus,* 1 Kg of papain, 1 Kg of phytase, 20 Kg of cellobiase, 80 Kg of glucanase, 1 Kg of xylanase, 0.05 Kg of pectinase, 1 Kg of fungal amylase, 0.5 Kg of beer yeast, 1 Kg of *Aspergillus niger,* 0.2 Kg of *Tichoderma reesei* and 0.05 Kg of *Geotrichum candidum* according to weights to obtain an initial material; conveying the initial material into a material mixing tank for mixing through a winch conveyor; spraying part of wastewater from a food processing plant into the material mixing tank to enable the water content of the initial material to be 80%; after the initial material is inly stirred and mixed, conveying the initial material to a hydraulic briquetting machine for briquetting; after briquetting, bagging a briquette with a plastic baa provided with a unidirectional ventilating valve, and sealing the opening of the bag; pertaining random sampling detection; and then transferring the bag into a temperature-controllable storehouse for enzymolysis under the condition of 28.degree. C. for 35 days, thereby obtaining the non-grain ecological feed.

Embodiment 5

The preparation method includes: mixing 450 Kg of corn straws, 200 Kg of jerusalem artichoke straws, 150 Kg of residues from juicing jerusalem artichoke, 20 Kg of residues from juicing carrot, 150 Kg of *Folium mori,* 80 Kg of *Astragalus membranaceus,* 15 Kg of papain, 15 Kg of phytase, 150 Kg of cellobiase, 5 Kg of glucanase, 20 Kg of xylanase, 1 Kg of pectinase, 0.05 Kg of fungal amylase, 10 Kg of beer yeast, 0.1 Kg of *Aspergillus niger,* 5 Kg of *Tichoderma reesei* and 1 Kg of *Geotrichum candidum* according to weights to obtain an initial material; conveying the initial material into a material mixing tank for mixing through a winch conveyor; spraying part of wastewater from a food processing plant into the material mixing tank to enable the water content of the initial material to be 55%; after the initial material is uniformly stirred and mixed, conveying the initial material to a hydraulic briquetting machine for briquetting; after briquetting, bagging a briquette with a plastic bag provided with a unidirectional ventilating valve, and sealing the opening of the bag; performing random sampling detection; and then transferring the bag into a temperature-controllable storehouse for enzymolysis under the condition of 32.degree. C. for 25 days, thereby obtaining the non-grain ecological feed.

Embodiment 6

The preparation method includes: mixing 600 Kg of corn straws, 120 Kg of jerusalem artichoke straws, 100 Kg of residues from juicing jerusalem artichoke, 50 Kg of residues from juicing carrot, 90 Kg of *Folium mori,* 20 Kg of *Astragalus membranaceus,* 5 Kg of papain, 4 Kg of phytase, 50 Kg of cellobiase, 10 Kg of glucanase, 15 Kg of xylanase, 0.3 Kg of pectinase, 0.1 Kg of fungal amylase, 1.5 Kg of beer yeast, 0.35 Kg of *Aspergillus niger,* 0.7 Kg of *Tichoderma reesei* and 0.1 Kg of *Geotrichum candidum* according to weights to obtain an initial material; conveying the initial material into a material mixing tank for mixing through a winch conveyor; spraying ordinary clean water into the material mixing tank to enable the water content of the initial material to be 70%; after the initial material is uniformly stirred and mixed, conveying the initial material to a hydraulic briquetting machine for briquetting; after briquetting, bagging a briquette with a plastic bag provided with a unidirectional ventilating valve, and sealing the opening of the bag; performing random sampling detection; and then transferring the bag into a temperature-controllable storehouse for enzymolysis under the condition of 30.degree. C. for 28 days, thereby obtaining the non-grain ecological feed.

Embodiment 7

The preparation method includes: mixing 540 Kg of corn straws, 100 Kg of jerusalem artichoke straws, 70 Kg of residues from juicing jerusalem artichoke 100 Kg of residues from juicing carrot, 50 Kg of *Folium* matt 30 Kg of *Astragalus membranaceus,* 4 Kg of papain, 5 Kg of phytase, 5 Kg of cellobiase, 30 Kg of glucanase, 5 Kg of xylanase, 0.25 Kg of pectinase, 0.15 Kg of fungal amylase, 3 Kg of beer yeast, 0.2 Kg of *Aspergillus niger,* 0.5 Kg of *Tichoderma reesei* and 0.2 Kg of *Geotrichum candidum* according to weights to obtain an initial material; conveying the initial material into a material mixing tank for mixing through a winch conveyor; spraying ordinary clean water into the material mixing tank to enable the water content of the initial material to be 65%; after the initial material is uniformly stirred and mixed, conveying the initial material to a hydraulic briquetting machine for briquetting; after briquetting, bagging a briquette with a plastic bag provided with a unidirectional ventilating valve, and sealing the opening of the bag; performing random sampling detection; and then transferring the bag into a temperature-controllable storehouse for enzymolysis under the condition of 30.degree. C. for 30 days, thereby obtaining the non-grain ecological feed.

Embodiment 8

The preparation method includes: mixing 560 Kg of corn straws, 140 Kg of jerusalem artichoke straws, 50 Kg of residues from juicing jerusalem artichoke, 80 Kg of residues from juicing carrot, 100 Kg of *Folium mori*, 10 Kg of *Astragalus membranaceus* 3 Kg of papain, 3 Kg of phytase, 100 Kg of cellobiase, 20 Kg of glucanase, 2 Kg of xylanase, 0.1 Kg of pectinase, 0.3 Kg of fungal amylase, 2 Kg of beer yeast, 0.5 Kg of *Aspergillus niger*, 0.8 Kg of *Tichoderma reesei* and 0.25 Kg of *Geotrichum candidum* according to weights to obtain an initial material; conveying the initial material into a material mixing tank for mixing through a winch conveyor; spraying ordinary clean water into the material mixing tank to enable the water content of the initial material to be 68%; after the initial material is uniformly stirred and mixed, conveying the initial material to a hydraulic briquetting machine for briquetting; after briquetting, bagging a briquette with a plastic bag provided with a unidirectional ventilating valve, and sealing the opening of the bag; performing random sampling detection; and then transferring the bag into a temperature-controllable storehouse for enzymolysis under the condition of 28.degree. C. for 30 days, thereby obtaining the non-grain ecological feed.

Embodiment 9

The preparation method includes: mixing 580 Kg of corn straws, 130 Kg of jerusalem artichoke straws, 90 Kg of residues from juicing jerusalem artichoke, 60 Kg of residues from juicing carrot, 70 Kg of *Folium mori*, 18 Kg of *Astragalus membranaceus*, 3.5 Kg of papain, 3.5 Kg of phytase, 78 Kg of cellobiase, 25 Kg of glucanase, 4 Kg of xylanase, 0.22 Kg of pectinase, 0.18 Kg of fungal amylase, 1.8 Kg of beer yeast, 0.4 Kg of *Aspergillus niger*, 0.75 Kg of *Tichoderma reesei* and 0.23 Kg of *Geotrichum candidum* according to weights to obtain an initial material; conveying the initial material into a material mixing tank for mixing through a winch conveyor; spraying ordinary clean water into the material mixing tank to enable the water content of the initial material to be 68%; after the initial material is uniformly stirred and mixed, conveying the initial material to a hydraulic, briquetting machine for briquetting; after briquetting, bagging a briquette with a plastic bag provided with a unidirectional ventilating valve, and sealing the opening of the bag; performing random sampling detection; and then transferring the bag into a temperature-controllable storehouse for enzymolysis under the condition of 32.degree. C. for 30 days, thereby obtaining the non-grain ecological feed.

It should be understood that those ordinary skilled in the art can make improvements or changes according to the above-mentioned description. All these improvements or changes shall belong to the protection scope of appended claims of the present invention.

I claim:

1. A non-grain ecological feed for monogastric animal, prepared from the following effective components in parts by weight:
    40 to 80 parts of corn straws; 1 to 25 parts of jerusalem artichoke straws, 0.5 to 20 parts of residues from juicing jerusalem artichoke, 0.5 to 20 parts of residues from juicing carrot, 0.5 to 20 parts of *Folium mori*, 0.1 to 15 parts of *Astragalus membranaceus*, 0.02 to 5 parts of papain, 0.02 to 5 parts of phytase, 0.5 to 20 parts of cellobiase, 0.1 to 15 parts of glucanase, 0.02 to 5 parts of xylanase, 0.001 to 0.3 part of pectinase, 0.001 to 0.3 part of fungal amylase, 0.01 to 3 parts of beer yeast, 0.002 to 0.5 part of *Aspergillus niger*, 0.005 to 1 part of *Tichoderma reesei* and 0.001 to 0.3 part of *Geotrichum candidum*.

2. The non-grain ecological feed according to claim 1 for monogastric animal, wherein the non-grain ecological feed is prepared from the following effective components in parts by weight: 45 to 70 parts of the corn straws, 5 to 20 parts of the jerusalem artichoke straws, 2 to 15 parts of the residues from juicing jerusalem artichoke, 2 to 15 parts of the residues from juicing carrot, 2 to 15 parts of the *Folium mori*, 0.5 to 8 parts *Astragalus membranaceus*, 0.1 to 1.5 parts of the papain, 0.1 to 1.5 parts of the phytase, 2 to 15 parts of the cellobiase, 0.5 to 8 parts of the glucanase, 0.1 to 2 parts of the xylanase, 0.005 to 0.1 part of the pectinase, 0.005 to 0.1 part of the fungal amylase, 0.05 to 1 part of the beer yeast, 0.01 to 0.1 part of the *Aspergillus niger*, 0.02 to 0.5 part of the *Tichoderma reesei* and 0.005 to 0.1 part of the *Geotrichum candidum*.

3. The non-grain ecological feed according to claim 2 for monogastric animal, wherein the non-grain ecological feed is prepared from the following effective components in parts by weight: 50 to 60 parts of the corn straws, 10 to 15 parts of the jerusalem artichoke straws, 5 to 10 parts of the residues from juicing jerusalem artichoke, 5 to 10 parts of the residues from juicing carrot, 5 to 10 parts of the *Folium mori*, 1 to 3 parts of the *Astragalus membranaceus*, 0.2 to 0.5 part of the papain, 0.2 to 0.5 part of the phytase, 5 to 10 parts of the cellobiase, 1 to 3 parts of the glucanase, 0.2 to 0.5 part of the xylanase, 0.01 to 0.03 part of the pectinase, 0.01 to 0.03 part of the fungal amylase, 0.1 to 0.3 part of the beer yeast, 0.02 to 0.05 part of the *Aspergillus niger*, 00.5 to 0.1 part of the *Tichoderma reesei* and 0.01 to 0.03 part of the *Geotrichum candidum*.

4. The non-grain ecological feed according to claim 3 for monogastric animal, wherein the non-grain ecological feed is prepared from the following effective components parts by weight: 54 to 58 parts of the corn straws, 12 to 14 parts of the jerusalem artichoke straws, 7 to 9 parts of the residues from juicing jerusalem artichoke, 6 to parts of the residues from juicing carrot, 7 to 9 parts of the *Folium mori*, 1.5 to 2 parts of the *Astragalus membranaceus*, 0.3 to 0.4 part of the papain, 0.3 to 0.4 part of the phytase, 7.5 to 8 parts of the cellobiase, 1.5 to 2.5 parts of the glucanase, 0.3 to 0.4 part of the xylanase, 0.02 to 0.025 part of the pectinase, 0.015 to 0.02 part of the fungal amylase, 0.15 to 0.2 part of the beer yeast, 0.03 to 0.04 part of the *Aspergillus niger*, 0.07 to 0.08 part 0.08 the *Tichoderma reesei* and 0.02 to 0.025 part of the *Geotrichum candidum*.

5. A preparation method of the non-grain ecological feed for monogastric animal according to claim 1, comprising the following steps:

A. mixing the effective components of the non-grain ecological feed according to mass ratios to obtain an initial material;
B. adding water into the initial material, and uniformly stirring and mixing the initial material and the water;
C. briquetting the mixture by using a hydraulic, briquetting machine; and
D. performing enzymolysis under an anaerobic condition.

6. The preparation method of the non-grain ecological feed for monogastric animal according to claim 5, wherein in Step B, after the water is added into the initial material, the water cement is 50% to 85%.

7. The preparation method of the non-grain ecological feed for monogastric animal according to claim 5, wherein in Step B, the water added into the initial material is wastewater from food processing plants.

8. The preparation method of the non-grain ecological feed for monogastric animal according to claim 5, wherein the preparation method further comprises Step E between Step C and Step D: after briquetting, bagging a briquette with a plastic bag provided with a unidirectional ventilating valve, and sealing the opening of the bag.

9. The preparation method of the non-grain ecological feed for monogastric animal according to claim 5, wherein in Step D, an enzymolysis temperature is 25° C. to 32° C., and the enzymolysis lasts for 15 to 40 days.

* * * * *